United States Patent [19]

Marlowe

[11] Patent Number: 4,921,062
[45] Date of Patent: May 1, 1990

[54] CAB-OVER-ENGINE TRUCK INCLUDING INTEGRATED NOSE HOOD

[75] Inventor: Huston Marlowe, Orinda, Calif.

[73] Assignee: PACCAR Inc., Bellevue, Wash.

[21] Appl. No.: 244,945

[22] Filed: Sep. 15, 1988

[51] Int. Cl.⁵ ............................................. B60K 20/04
[52] U.S. Cl. .................. 180/89.14; 180/89.16
[58] Field of Search ............... 180/89.14, 89.16, 89.1, 180/68.4

[56] References Cited

U.S. PATENT DOCUMENTS

| | | | |
|---|---|---|---|
| D. 163,279 | 5/1951 | Harris | D14/3 |
| 2,699,223 | 1/1955 | Brumbaugh | 180/89.14 |
| 2,769,501 | 11/1956 | Wagner | 180/68 |
| 3,217,354 | 11/1965 | May | 16/128 |
| 3,282,368 | 11/1966 | Pittera | 180/53 |
| 3,792,889 | 2/1974 | Fuener et al. | 293/63 |
| 3,844,369 | 10/1974 | Schroeder et al. | 180/68 P |
| 3,935,920 | 2/1976 | Schiel | 180/89 A |
| 4,109,485 | 8/1978 | Grosskopf | 180/89.14 |
| 4,141,427 | 2/1979 | Kirchweger et al. | 180/89.14 |
| 4,210,221 | 7/1980 | McMillen et al. | 180/89.14 |

OTHER PUBLICATIONS

Diesel Truck Index, pp. 28 & 29, International Transtar Model No. F-4170 Conco.

Primary Examiner—Richard A. Bertsch
Attorney, Agent, or Firm—Flehr, Hohbach, Test, Albritton & Herbert

[57] ABSTRACT

A truck of the cab-over-engine type is disclosed herein and includes a cab which has a front windshield and opposite side doors and which is mounted over the truck's engine and many of the engine's cooperating components including its radiator for pivotal movement between an upstanding operating position and a tilted maintenance position. The truck also includes a frontal nose hood which carries a grille, front bumper and headlights and which is mounted to the cab in front of the radiator and forward of the front windshield for pivotal movement between a closed, generally vertical operating position in front of the radiator and a tilted open position. The frontal nose hood, when in its closed operating position, extends upward in front of the cab such that its top edge lies immediately in front of and adjacent to the bottom edge of the front windshield and extends rearward on opposite sides and outward of the cab so that its opposite side edges are adjacent to the edges of the cab doors closest to the front of the truck. Other features of this truck include the ability to step up on the nose hood to reach the front windshield and to pivot the cab to its tilted position only after the nose hood has been moved to its open position.

21 Claims, 3 Drawing Sheets

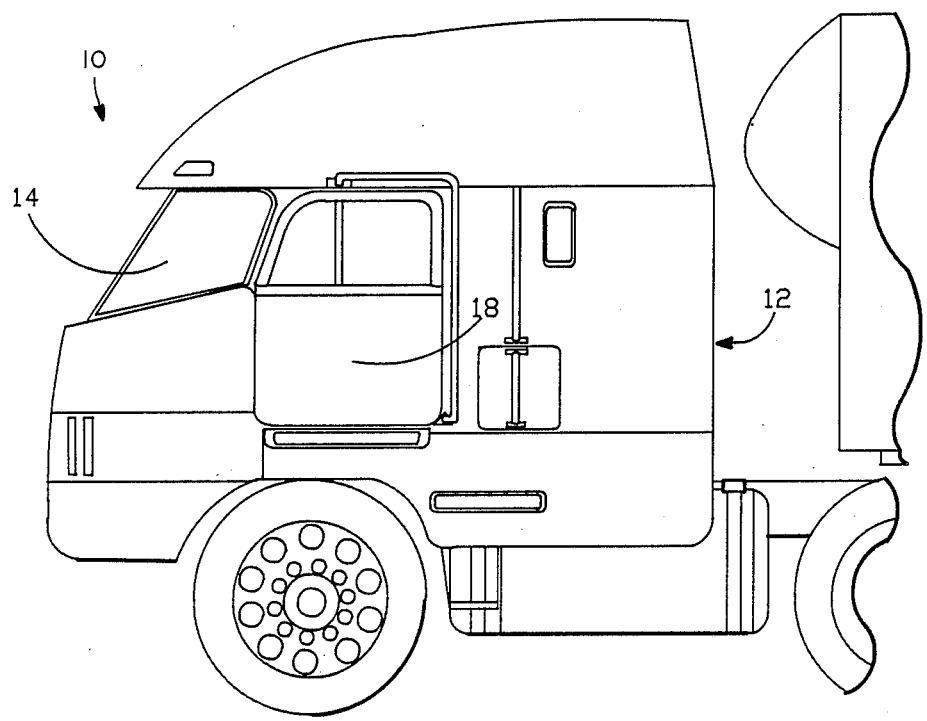
FIG.−1
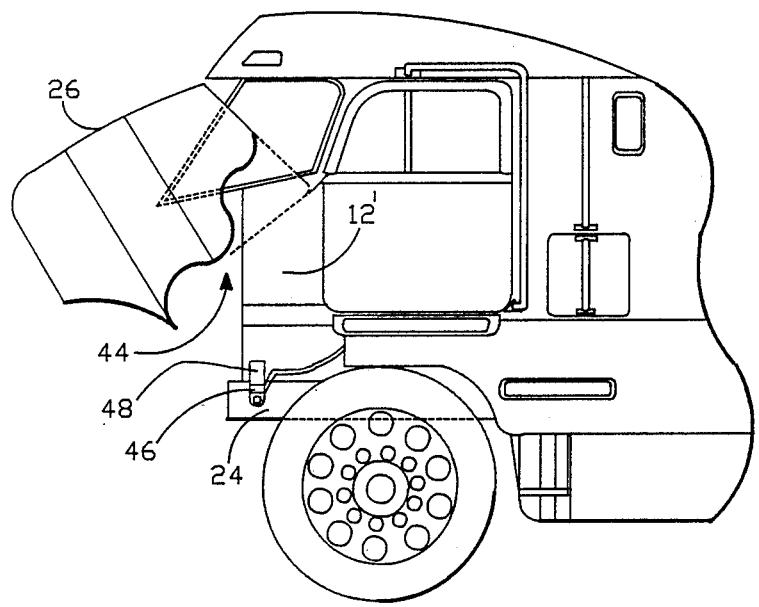
FIG.−2

CAB-OVER-ENGINE TRUCK INCLUDING INTEGRATED NOSE HOOD

The present invention relates generally to a cab-over-engine (COE) type of truck and more particularly to a specifically configured tiltable nose hood forming a part of the overall truck.

A typical truck of the cab-over-engine type known in the prior art includes a cab which is mounted over the truck's engine and many of the engine's cooperating components including its radiator for pivotal movement between an upstanding, operating position and a tilted, maintenance position. Two examples of such a truck may be found in U.S. Pat. No. 3,935,920 to Schiel and much earlier U.S. Pat. No. 2,699,223 to Brumbaugh. The Schiel patent is pertinent to the present invention to the extent that it includes a tiltable grille in front of the cab and Brumbaugh is especially pertinent in that it includes a pivotal nose hood. However, as will be seen hereinafter, the present invention is an improvement over both Brumbaugh and Schiel as well as other prior art of which applicant is aware.

As will be described in more detail hereinafter, the present invention relates specifically to a truck of the cab-over-engine type including a cab which has a front windshield and opposite side doors, and which, as stated immediately above, is mounted over the truck engine and many of the engine's cooperating components including its radiator for pivotal movement between an upstanding, operating position and a tilted, maintenance position. The present invention resides in an improved frontal nose hood for the truck, which nose hood is mounted to the cab in front of the radiator and forward of the front windshield for pivotal movement between a closed, generally vertical operating position in front of the radiator and a tiled, open position for gaining access to the radiator and certain ones of the components cooperating with many other truck systems.

In accordance with one feature of the present invention, as will be disclosed in more detail hereinafter, the frontal nose hood, when it is in its closed operating position, extends upward in front of the cab such that its top edge lies immediately in front of and adjacent to the bottom edge of the windshield, preferably slightly above the bottom seal of the windshield. At the same time, the nose hood extends rearward on opposite sides and outward of the cab, wrapping around the cab, so that its opposite side edges are adjacent to the edges of the cab doors closest to the front of the truck. In this way, the nose hood serves as a "redundant skin" for much of the front face of the truck and some of its sides, thereby serving as a second or redundant weather barrier. The nose hood also hides the windshield wiper assembly immediately below the front windshield, thereby protecting it against the weather, especially as the truck moves forward at relatively high speeds. By "wrapping" the nose hood about the sides of the truck, additional components, for example, the truck's air horn, can be placed outside the cab and yet be protected from the elements by placing those components between the cab's bulkhead and the wrap-around sides of the nose hood.

In accordance with another feature of the present invention, the nose hood carries with it a front grille, front bumper means and, in a preferred embodiment, the truck's front headlights. In this way, when the nose hood is moved to its tilted open position, all of these other components tilt with the hood and therefore out of the way, thereby leaving room for the trucker to gain access to the various components associated with the many truck systems without having to tilt up the cab itself.

In accordance with still another feature of the present invention, the nose hood is configured to include a hand grip along its top edge and a stepping surface at its bumper means so that the trucker can easily gain access to the windshield for washing it, if necessary.

In accordance with yet another feature of the present invention, an actuating mechanism for causing the cab itself to move between its upstanding operating position and its tilted maintenance position is located behind the nose hood when the latter is in its closed position and accessible only when the nose hood is moved to its tilted position. This insures that the cab can be tilted only when the nose hood has been tilted.

In accordance with a further feature of the present invention, and one which relates to the wrap-around configuration of the nose hood, the nose hood is pivotally mounted to the cab at points on opposite sides of the cab and adjacent the top back edges of the nose hood. In that way, the nose hood can be tilted open to a greater height than would be case if it were pivotally mounted across its top edge and to the front of the truck cab, as in the case in the prior art. This, in turn, allows the trucker to move freely under the hood without having to bend down, in most cases.

These and other features of the present invention will be described in detail hereinafter in conjunction with the drawings wherein:

FIG. 1 is a side elevational view of a cab-over-engine truck with a cab and nose hood designed in accordance with the present invention;

FIG. 2 is a side elevational view of the truck illustrated in FIG. 1, specifically illustrating its nose hood in a tilted upward position;

Figure 3:
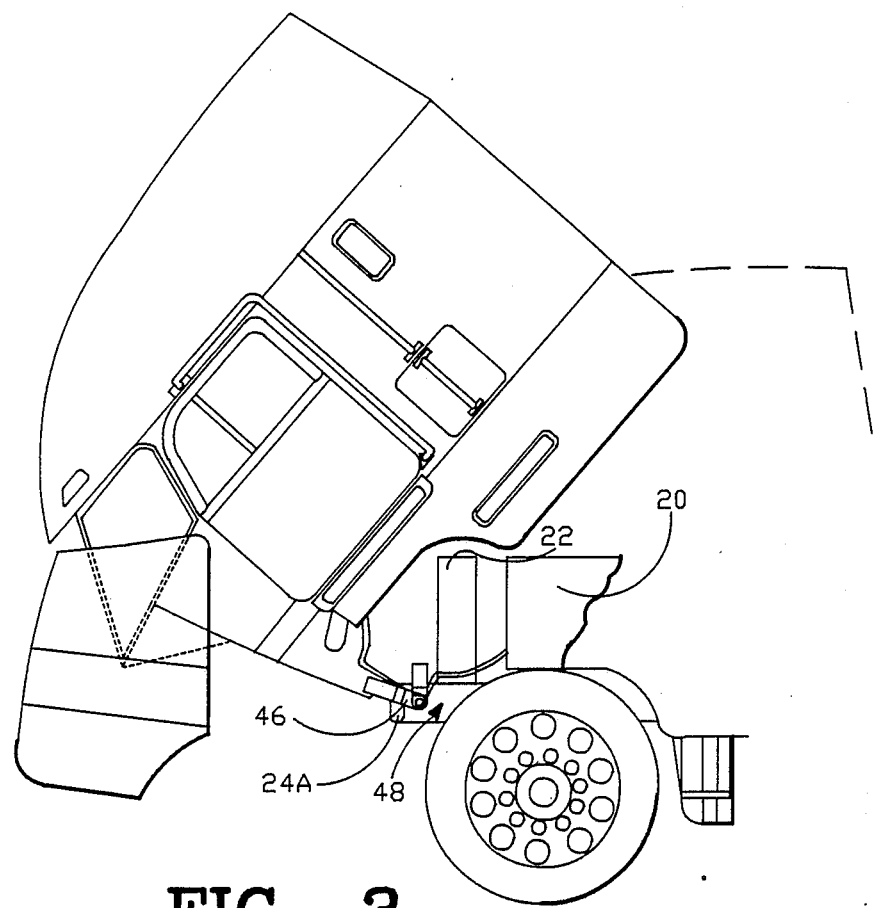
FIG. 3 is a side elevational view of the truck shown in FIGS. 1 and 2, specifically illustrating both its cab and its nose hood in tilted positions.

Turning now to the drawings, wherein like components are designated by like reference numerals throughout the various figures, a cab-over-engine (COE) truck is shown in FIGS. 1–3 and is generally designated by the reference numeral 10. This COE truck includes a cab 12 having the various components a cab of a COE truck would be expected to have including but not limited to a front windshield 14, a windshield wiper assembly 16 located just below the windshield (see FIG. 5), and opposite side doors, one of which is shown at 18 in FIGS. 1–3. The cab 12 is mounted over the truck engine, as diagrammatically represented at 20, and many of the engine's cooperating components including its radiator 22 for pivotal movement between an upstanding, operating position illustrated in FIGS. 1 and 2 and a tilted maintenance position shown in FIG. 3. The various components cooperating with truck systems, besides the radiator, are known in the art and, hence, will not be set forth in detail herein. It suffices to say, for the moment, that these components include but are not limited to, for example, a cable shift control, cable throttle, clutch/pulleys, electric wiper motors, a window washer bottle, air conditioning and heating systems, as well as other components. As will be seen hereinafter, cab 12 is mounted to the truck's chassis, which is generally indicated at 24, in accordance with one aspect of the present invention.

Figure 4:
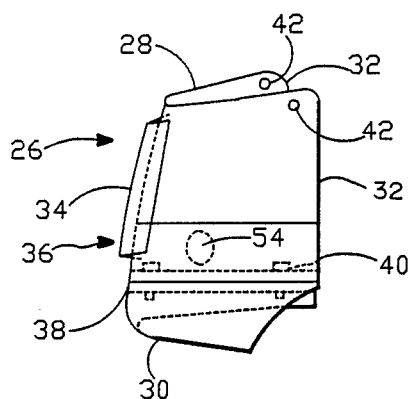
FIG. 4 is a side elevational view of the nose hood.

Overall COE truck 10 also includes a frontal nose hood 26 which is illustrated by itself in FIG. 4. As seen there, the nose hood is generally U-shaped in horizontal section and includes an uppermost generally U-shaped top edge 28, a similarly shaped lowermost bottom edge 30, opposing back edges 32 and a front face 34. In a preferred embodiment of the present invention, front face 34 includes a front grille generally indicated at 36 and a front bumper 38. In the embodiment illustrated, the front bumper extends from one back edge 32 to the other, that is it wraps around with the rest of the nose hood. Moreover, it is preferably disengageably connected to the rest of the nose hood by means of bolts 40 or other suitable fastening means, through cooperating flanges in the bumper and the rest of the hood. In that way, the front bumper can be readily removed and replaced if it becomes damaged. On the other hand, the entire nose hood including the bumper could be formed as a unitary member of any suitable material, for example, glass reinforced resin.

As illustrated in FIGS. 1–3, frontal nose hood 26 is mounted at pivot points 42 to opposite sides of cab 12 just in front of side doors 18 for pivotal movement between the closed, generally vertically operating position shown in FIG. 1 and the tilted, open position, as illustrated in FIGS. 2 and 3. With the nose hood in its closed, operating position, it extends vertically upward in front of radiator 22 so that its top edge 28 is located adjacent to and preferably slightly above the bottom seal of front windshield 14. In this way, the windshield wiper assembly (see FIG. 5) is hidden from view and shielded against the ambient elements by the hood as the truck moves forward. At the same time, the nose hood wraps around the front sides and the front of cab 12 from one back edge 32 to the opposite back edge 32, specifically so that when the nose hood is in its closed, operating position its back edges are adjacent to the forwardmost edges of side doors 18. Moreover, in this way, what may be characterized as a "double skin" or redundant weather shield is provided around the front sides and front face of the cab, thereby providing greater weather protection to those areas which are more severely subjected to the weather than the rest of the cab, as the truck moves forward. Moreover, by shielding the front sides of the cab along with the front face, a number of the truck components that normally reside within the cab may be located between the nose hood and the cab. For example, wiper motor 44 is shown in FIG. 2 located on the outside of the cab in front of a side door 18 but within the nose hood 26. Other components located outside the cab but within the nose hood include air conditioning and heating units (normally within the cab), an oil fill and dip stick, and so on.

As indicated immediately above, the nose hood 26 is mounted for pivotal movement at the points 42 to opposite sides of cab 12 just in front of side doors 18. It is an important feature of the present invention that nose hood 26 not only wraps around the front sides and front of cab 12, but also that it is pivotally mounted to the cab at its upper back edges. This means that, as the nose hood is raised, as shown best in FIG. 2, the front face 26 rises above the pivot points, thereby raising the hood upward to a greater extent than would be possible if the hood were pivotally mounted to the cab at its front edge. Thus, nose hood 26 is to be distinguished in a number of respects from, for example, the previously recited Brumbaugh U.S. Pat. No. 2,699,223. In this latter patent, the tilting nose section shown there is not wrapped around the truck cab to the extent that its back edges are adjacent the side doors of the truck, and it is not hinged at its top back edges to the sides of the truck, but rather along its front edge.

Nose hood 26 may be pivotally mounted to cab 12 in any suitable manner. However, in accordance with a preferred embodiment of the present invention, it is mounted to the cab in the matter disclosed in copending patent application Ser. No. 244,722, filed Sept. 14, 1988, and entitled VEHICLE NOSE PIVOTAL HINGE ASSEMBLY which is assigned to assignee of this application.

Still referring to FIG. 1 in conjunction with FIG. 2 and summarizing the foregoing, it should be noted that cab 12 includes a forward-facing bulkhead 12' (see FIG. 2) which extend rearwardly a substantially distance thereof so as to define opposite rearwardmost side edges adjacent the forwardmost side edges of cab doors 18. It should also be noted that the windshield 14 is located above the bulk-head and extends rearwardly on opposite sides thereof so as to define rearwardmost side edges above the side edges of the bulkhead and adjacent the forwardmost side edges of doors 18. Finally, it should be noted that the frontal nose hood 26 is mounted to the cab in front of the bulkhead and forward of and below the front windshield for pivotal movement between a closed, generally vertical operating position in front of the bulkhead and a tilted open position for gaining access to the bulkhead. In accordance with the present invention, the frontal nose hood when in its closed operating position extends upward in front of the cab such that its top edge lies immediately in front of and adjacent to the bottom edge of the windshield and extends rearward on opposite sides and outward of the cab so that its opposite side edges are adjacent the forwardmost side edges of the cab door, whereby to enclose the entire bulkhead.

Turning now to FIGS. 2 and 3, attention is briefly directed to chassis frame 24 which is used to pivotally support cab 12 for movement between its operating and tilted positions. In a preferred embodiment of the present invention, the chassis frame itself including its frontmost cross member 24a (FIG. 3) extends in a common horizontal plane with radiator 22 being disposed immediately behind the front cross member. As seen in FIGS. 2 and 3, suitable means generally indicated at 46 serve to pivotally mount the cab to the chassis frame at a point near cross member 24a. Suitable and readily providable actuating means generally indicated at 48 are provided for causing the cab to pivot between its upstanding and tilting positions. Note specifically in FIGS. 2 and 3 that the actuating means are located behind the nose hood when the latter is in its closed position and accessible only when the nose hood is moved to its tilted position. This insures that the nose hood is always tilted open before the cab can be moved from its operating position to its tilted position. This, in turn, is important since if the cab is tilted while the nose hood is closed, it will damage the nose hood or cab.

Figure 5:
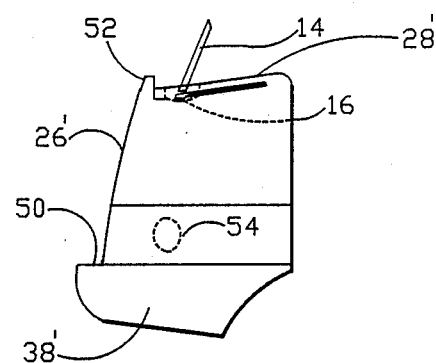
FIG. 5 is a side elevational view of a modified nose hood.

Referring now to FIG. 5, attention is directed to a slightly modified nose hood 26'. This hood may be identical to hood 26 to the extent that it includes the same wrap-around features and a grille. However, its bumper which is generally indicated at 38' is mounted slightly in front of the rest of the hood so as to provide a stepping surface 50 for access from the front of the nose hood. At the same time, the top edge 28' of the nose hood 26' includes a segment 52 which is spaced a sufficient distance in front of the cab to serve as a handgrip. In this way, the trucker can step onto surface 50 grabbing onto grip 52 and easily reach the front windshield for cleaning it. Indeed, the very front of top edge 28 of nose hood 26 could also serve as a gripper without requiring an extended portion. In fact, while segment 52 of nose hood 26' is shown extending above windshield wiper assembly 16 for hiding the latter, the nose hood 26 could be appropriately dimensioned to do the same thing without requiring a raised segment 52. Moreover, rather than providing a step-out type of bumper 38', the bumper 38 could be formed with its own step surface, for example an opening for the trucker's foot. Moreover, either the nose hood 26 or 26' could be provided with headlights 54 which would move with the nose hood, thereby moving them out of the way along with grille 36 and bumper 38 or 38'.

Figure 6:
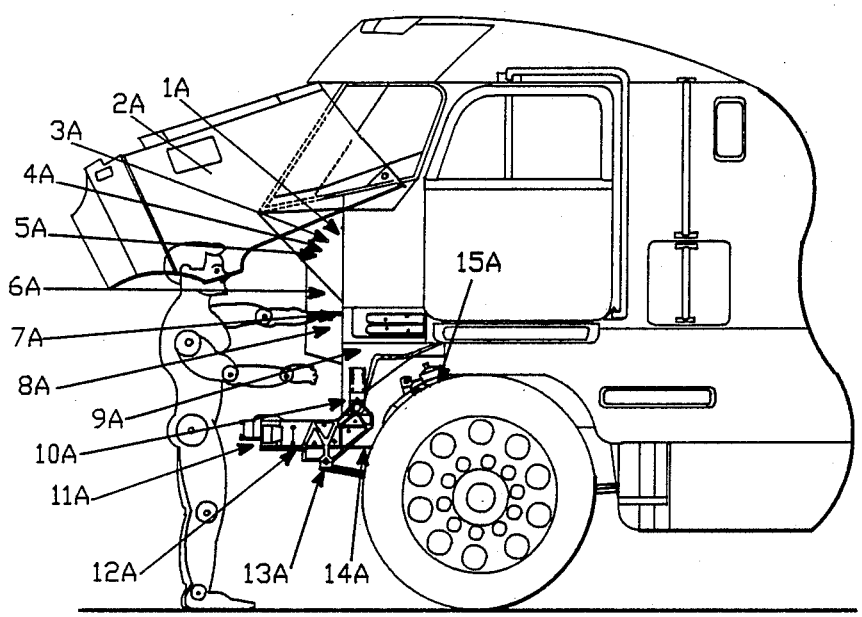
FIGS. 6 and 7 illustrate an actual working embodiment of the prevent invention.
Figure 7:
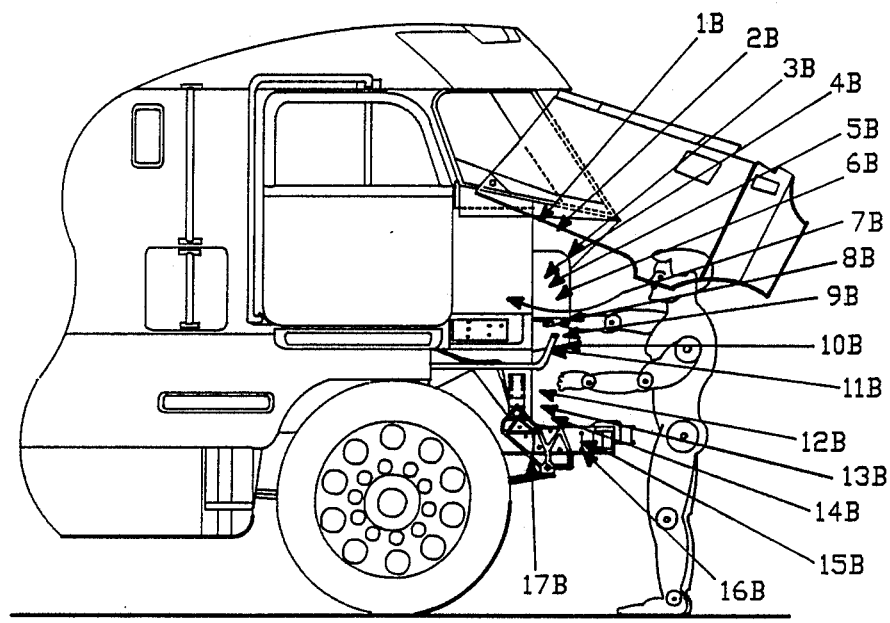

FIGS. 6 and 7 illustrate an actual working embodiment of truck 10 specifically showing various operating components located immediately behind nose hood 26. In FIGS. 6 and 7 those components are as follows:

1A—Brake Valve
2A—Replacematic Headlight Bulb
3A—Electric Horn
4A—Electrical Connections
5A—Pressure Switches
6A—Tractor Protection Valve
7A—Air Systems Connections
8A—Washer Bottle
9A—Airhorn
10A—IIOV. Engine Heat Plug
11A—Driving Lights
12A—Forward Dry Tank
13A—Spring Pin Grease
14A—Brake Limiting Valve
15A—Steering Gear
1B—Radiator Fill
2B—Wiper Motors
3B—Heater Blowers
4B—Water Valve & Hose Connections
5B—Heater/A.C. Cores
6B—Moisture Indicator
7B—Engine Charge Air cooler
8B—Heater Air Filter
9B—Recirculation Valve
10B—Fresh Air Intake
11B—Oil Check & Fill
12B—Receiver Dryer
13B—Freon Pressure Swiches
14B—A.C. Condenser
15B—Cab Tilt Pump, Valve & Reservoir
16B—Fan Clutch Solenoid & Water Eliminator
17B—Electrical Connections

I claim:

1. In a truck of the cab-over-engine type, the improvement comprising a cab having a forward facing bulkhead which extends rearwardly a substantial distance on opposite sides thereof so as to define opposite rearward-most side edges, opposite side doors having forward-most side edges adjacent the rearward-most side edges of said bulkhead and a front windshield which is located above said bulkhead and which extends rearwardly on opposite sides thereof so as to define rearward-most side edges above the side edges of said bulkhead and adjacent the forward-most side edges of said doors, said cab being mounted over the truck engine and many of the engine's cooperating components including its radiator for pivotal movement between an upstanding operating position and a tilted maintenance position, the improvement further comprising a frontal nose hood mounted to said cab in front of said radiator and bulkhead and forward of and below said front windshield for pivotal movement between a closed, generally vertical operating position in front of the radiation and bulkhead and a tilted open position for gaining access to said radiator and bulkhead and certain ones of said components cooperating with truck systems, said frontal nose hood when in its closed operating position extending upward in front of the cab such that its top edge lies immediately in front of and adjacent to the bottom edge of said front windshield and extending rearward on opposite sides and outward of said cab so that its opposite side edges are adjacent the forward-most side edges of said cab doors and adjacent the rearward-most edges of the bulkhead, whereby to enclose the entire bulkhead.

2. The improvement according to claim 1 wherein said truck includes a grille and front bumper means connected with and forming part of said frontal nose hood, whereby when the hood is in its tilted open position, the grille and bumper means move out of the way with it.

3. The improvement according to claim 2 wherein said bumper means is disengageably fastened to the rest of said nose hood.

4. The improvement according to claim 2 wherein said truck includes headlights mounted to and carried by said nose hood.

5. The improvement according to claim 2 wherein said bumper means is a unitary bumper extending the entire width of said nose hood.

6. The improvement according to claim 2 wherein said bumper means includes a stepping surface for access from in front of said nose hood, whereby to reach said front windshield for cleaning the latter.

7. The improvement according to claim 6 wherein at least a section of the top edge of said nose hood is spaced a sufficient distance in front of said cab to serve as a hand grip for pulling up on said stepping surface.

8. The improvement according to claim 1 wherein said truck includes a windshield wiper assembly mounted on the front of said cab just below the front windshield and wherein said top edge of said nose hood extends up above said windshield wiper assembly so as to hide it from view and protect it from the elements.

9. The improvement according to claim 8 wherein the top edge of said nose hood extends above the bottom seal of the front windshield so as to protect it from the elements when the hood is in its closed position.

10. The improvement according to claim 1 wherein said truck includes actuating means for causing said cab to pivot between its upstanding and tilting positions, said actuating means being located behind said nose hood when the latter is in its closed position and accessible only when the nose hood is moved to its tiled position, whereby to insure that said nose hood is always tilted when said cab is tilted.

11. The improvement according to claim 1 wherein said truck has a chassis frame which includes a frontmost cross member and which extends entirely within a common horizontal plane, wherein said frontmost cross member is disposed in front of said radiator, and wherein said cab is mounted for said pivotal movement to said chassis frame adjacent said frontmost cross member.

12. The improvement according to claim 1 wherein rearward top edge segments of said nose hood are pivotally mounted to opposite sides of the cab at points rearwardly spaced from the front of the cab, whereby the forwardmost segment of the top edge of said nose hood rises above points at which the nose is pivotally mounted to the cab.

13. The improvement according to claim 1 including separate pivot means on opposite sides of said cab at locations defining the upper and rearward most points of said frontal nose hood for supporting the latter for said pivotal movement between its closed and opened positions.

14. The improvement according to claim 13 wherein the top edge of said frontal nose hood extends between said separate pivot means and wherein a front most segment of said top edge is spaced a slight distance in front of said cab, whereby to serve as a hand-grip.

15. In a truck of the cab-over-engine type including a cab mounted over the truck engine and many of the engine's cooperating components including its radiator for pivotal movement between an upstanding operating position and a tilted maintenance position, the improvement comprising a frontal nose hood mounted to said cab in front of said radiator for pivotal movement between a closed, generally vertical operating position in front of the radiator and a tilted open position for gaining access to said radiator and certain ones of said components cooperating with the truck systems, said front nose hood including a grille exposed immediately in front of said radiator when the hood is in its closed position, and bumper means located below the grille, whereby when the hood is in its tilted open position, the grille and bumper means move out of the way with it.

16. The improvement according to claim 15 wherein said bumper means is disengageably connected to the rest of said nose hood.

17. The improvement according to claim 16 wherein said bumper means is a unitary bumper extending the entire width of said nose hood.

18. The improvement according to claim 17 wherein said truck includes headlights mounted to and carried by said nose hood.

19. The improvement according to claim 15 wherein said bumper means includes a stepping surface for access from in front of said nose hood, whereby to reach above the hood when the latter is in its operating position.

20. A truck of the cab-over-engine type including a cab which has a front windshield and windshield wiper assembly below the windshield, and which is mounted over the truck engine and many of the engine's cooperating components including its radiator for pivotal movement between an upstanding operating position and a tilted maintenance position, the improvement comprising a front nose hood mounted to said cab in front of said radiator and forward of said windshield for pivotal movement between a closed, generally vertical operating position in front of the radiator and a tilted open position for gaining access to said radiator and certain ones of said components of truck systems, said frontal nose hood when in its closed operation position extending upward in front of the cab so as to define a top edge immediately in front of and adjacent to the bottom edge of said front windshield and above said windshield wiper assembly so as to hide it from view and protect it from the elements, at least a section of the top edge of said nose hood being spaced a sufficient distance in front of said cab to serve as a hand grip and said nose hood including a step opening near its bottom for stepping into in order to reach said hand grip, whereby to serve to reach said windshield for cleaning the latter.

21. In a truck of the cab-over-engine type, the improvement comprising:
 (a) a chassis frame which includes a frontmost cross member extending entirely within a common horizontal plane;
 (b) a cab including a front windshield, a windshield wiper assembly located immediately below the front windshield, and opposite side doors, said cab being mounted to opposite sides of said chassis frame adjacent its frontmost cross member and over the truck's engine and many of the engine's cooperating components including its radiator which is located behind its frontmost cross member, said cab being mounted to said chassis frame for pivotal movement between an upstanding operating position and a tilted maintenance position;
 (c) a frontal nose hood mounted to said cab in front of said radiator and forward of said front windshield for pivotal movement between a closed, generally vertical operating position in front of the radiator and a tilted open position for gaining access to said radiator and certain ones of said truck system components, said frontal nose hood when its closed operating position extending upward in front of the cab such that its top edge lies immediately in front of and adjacent to the bottom edge of said front windshield and over said windshield wiper assembly and extending rearwardly on opposite sides and outward of said cab so that its opposite side edges are adjacent the edges of said cab doors closest to the front of the truck, said nose hood including a grille and front bumper means connected with and forming part of said frontal nose hood, whereby when the hood is in its tilted open position, the grille and bumper means move out of the way with it, said bumper means including a stepping surface for access from in front of said nose hood, whereby to reach said front windshield for cleaning the latter, said top edge of said nose hood including at least a section which is spaced a sufficient distance in front of the cap to serve as a hand grip for pulling up on said stepping surface;
 (d) actuating means for causing said cab to pivot between its upstanding and tilting positions, said actuating means being located behind said nose hood when the latter is in its closed position and accessible only when the nose hood is moved to a tilted position, whereby to insure that said cab can be tilted only after the nose hood has been tilted.

* * * * *

UNITED STATES PATENT AND TRADEMARK OFFICE
CERTIFICATE OF CORRECTION

PATENT NO. : 4,921,062
DATED : May 1, 1990
INVENTOR(S) : HUSTON MARLOWE

It is certified that error appears in the above-identified patent and that said Letters Patent is hereby corrected as shown below:

Claim 1, Column 6, line 16, delete "radiation" and insert ---radiator---.

Signed and Sealed this

Fourteenth Day of May, 1991

Attest:

HARRY F. MANBECK, JR.

*Attesting Officer*  *Commissioner of Patents and Trademarks*